US011976507B2

(12) United States Patent
Pohl et al.

(10) Patent No.: US 11,976,507 B2
(45) Date of Patent: May 7, 2024

(54) METHOD FOR ALLOCATING OPERATING PARAMETERS TO LOCAL CONTROL UNITS INTENDED TO CONTROL A DOOR MOVEMENT IN A MOTOR VEHICLE

(71) Applicant: Brose Fahrzeugteile SE & Co. Kommanditgesellschaft, Bamberg, Bamberg (DE)

(72) Inventors: Florian Pohl, Ebersdorf (DE); Udo Geuther, Bamberg (DE); Thomas Fischer, Forchheim (DE); René Bekendam, Remscheid (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 927 days.

(21) Appl. No.: 16/971,485

(22) PCT Filed: Feb. 21, 2019

(86) PCT No.: PCT/EP2019/054285
§ 371 (c)(1),
(2) Date: Aug. 20, 2020

(87) PCT Pub. No.: WO2019/162363
PCT Pub. Date: Aug. 29, 2019

(65) Prior Publication Data

US 2020/0386030 A1 Dec. 10, 2020

(30) Foreign Application Priority Data

Feb. 23, 2018 (DE) ..................... 10 2018 202 784.6

(51) Int. Cl.
*E05F 15/70* (2015.01)
*E05F 15/695* (2015.01)

(52) U.S. Cl.
CPC ............ *E05F 15/70* (2015.01); *E05F 15/695* (2015.01); *E05Y 2400/315* (2013.01);
(Continued)

(58) Field of Classification Search
CPC .. E05F 15/70; E05F 15/695; E05Y 2400/315; E05Y 2400/41; E05Y 2400/44;
(Continued)

(56) References Cited

U.S. PATENT DOCUMENTS 7,219,945 B1 * 5/2007 Zinn ........................ B60J 5/101 49/26
10,147,252 B2 * 12/2018 Schindler ................ H04L 12/40
(Continued)

FOREIGN PATENT DOCUMENTS

DE 102010017798 A1 1/2012
DE 202013100498 U1 5/2014
(Continued)

*Primary Examiner* — Jason Holloway
*Assistant Examiner* — Madison B Emmett
(74) *Attorney, Agent, or Firm* — Dickinson Wright PLLC

(57) ABSTRACT

A method for allocating operating parameters to at least two local control units intended to control a door movement for a motor vehicle, wherein: a plurality of parameter records of operating parameters is stored in each local control unit; a plurality of values of a detection criterion is stored in each local control unit, said detection criterion being based on at least two values of an electric variable; for at least one local control unit, a value of the detection criterion is prepared using the electric variable; in each local control unit the detection criterion is queried; and, a parameter record is selected in accordance with the value of the detection criterion determined during the query, and the corresponding operating parameters are allocated to the local control unit.

20 Claims, 8 Drawing Sheets

(52) U.S. Cl.
CPC ....... *E05Y 2400/41* (2013.01); *E05Y 2400/44* (2013.01); *E05Y 2900/531* (2013.01)

(58) Field of Classification Search
CPC ........... E05Y 2900/531; E05Y 2400/30; E05Y 2400/40; E05Y 2400/415; E05Y 2400/42; E05Y 2800/73; E05Y 2900/50
See application file for complete search history.

(56) References Cited

U.S. PATENT DOCUMENTS

| | | | | |
|---|---|---|---|---|
| 2006/0108874 | A1* | 5/2006 | Kalb | E05B 81/80 307/10.2 |
| 2010/0121537 | A1* | 5/2010 | Tanaka | B60R 21/01 701/47 |
| 2012/0005963 | A1* | 1/2012 | Zellmer | G05B 13/024 49/358 |
| 2012/0019404 | A1* | 1/2012 | Brosio | F02D 41/28 341/112 |
| 2012/0109467 | A1* | 5/2012 | Jousse | B60R 21/017 701/45 |
| 2013/0274897 | A1* | 10/2013 | Herthan | H04L 12/403 700/3 |
| 2017/0292310 | A1* | 10/2017 | Podkopayev | E05C 17/006 |
| 2018/0347252 | A1* | 12/2018 | Zeabari | B60J 5/102 |
| 2019/0017299 | A1* | 1/2019 | Capalau | E05B 81/12 |
| 2019/0078371 | A1* | 3/2019 | Pohl | E05F 15/76 |
| 2019/0249476 | A1* | 8/2019 | Pohl | E05F 15/46 |

FOREIGN PATENT DOCUMENTS

| | | | |
|---|---|---|---|
| DE | 102017204341 | A1 | 9/2017 |
| DE | 102016114376 | A1 | 2/2018 |
| WO | 9213300 | A1 | 8/1992 |
| WO | 9621889 | A1 | 7/1996 |

* cited by examiner

METHOD FOR ALLOCATING OPERATING PARAMETERS TO LOCAL CONTROL UNITS INTENDED TO CONTROL A DOOR MOVEMENT IN A MOTOR VEHICLE

CROSS-REFERENCE TO RELATED APPLICATIONS

This application is the U.S. National Phase of PCT Application No. PCT/EP2019/054285 filed on Feb. 21, 2019, which claims priority to German Patent Application No. DE 10 2018 202 784.6, filed on Feb. 23, 2018, the disclosures of which are hereby incorporated in their entirety by reference herein.

TECHNICAL FIELD

The present disclosure relates to a method for allocating operating parameters to control a door movement for a motor vehicle.

BACKGROUND

In motor vehicles, the movements of vehicle doors are increasingly controlled by assistance systems, and different options exist for the process of closing a vehicle door, to improve the operating convenience and also the safety of passengers who are located in the vicinity of a vehicle door during the closing process, by an assistance system, for example, a door closing system or a pinch protection system.

For example, a door closing system can close a vehicle door fully automatically upon an external command of a user, and then optionally also additionally lock it. The command can be given in this case, for example, via a remote control, by a hand gesture, or also mechanically by a force action on the corresponding vehicle door. The closing of the vehicle door can also take place in the context of a standard routine, for example, if a certain time span has passed after a triggering event.

SUMMARY

The present disclosure may be based on one or more objects such as allocating at least two local control units for a motor vehicle, each configured to control a door movement, their corresponding operating parameters in such a way that the local control units can be designed to be structurally identical, and do not require physical mobile components for selecting the operating parameters. The present disclosure is furthermore based on the object of specifying a corresponding local control unit, the operating parameters of which can be allocated in said manner.

According to one or more embodiments a method for allocating operating parameters to at least two local control units for a motor vehicle each intended to control a door movement is provided. A plurality of parameter sets of operating parameters is stored in each of the local control units, and a recognition criterion and in particular a plurality of values of the recognition criterion is stored in each of the local control units, which is based on at least two values of an electrical quantity, and a value of the recognition criterion is prepared via the electrical quantity for at least one of the local control units, and the recognition criterion is queried in each of the local control units, and a parameter set is selected in dependence on the value of the recognition criterion determined upon the query, and the corresponding operating parameters are allocated to the respective local control unit.

Advantageous designs, which are partially inventive as such, are the subject matter of the dependent claims and the following description.

Local control units each intended to control a door movement are to be understood in this case in particular as local control units which are intended to be incorporated into a system which has multiple equivalent local control units, which are intended together to control door movements of different vehicle doors, and each individual vehicle door can be controlled by one or more of the local control units, and for example each of the local control units can be assigned to precisely one vehicle door, i.e., each of the local control units contributes to the control of the door movements of precisely one vehicle door. A local control unit may be configured to control a door movement in this case if its intended application comprises the control of the door movement, for example a specific vehicle door. As an example, the or each local control unit is also configured, after the method for allocating the operating parameters is successfully carried out, to actually carry out the control of the door movement.

A control of a door movement may include the control of an automated movement of a vehicle door by utilizing at least one corresponding motor, for example, in the context of a door closing system, and also the automated stopping of a closing movement of a closing vehicle door, for example, in the context of a pinch protection system.

A plurality of parameter sets of operating parameters is to be understood in this case to mean that the entirety of the values of the various operating parameters, which are to be allocated to an individual local control unit for the intended operation, are compiled to form a parameter set. Since the local control units are to operate using not necessarily identical operating parameters for the intended operation, the individual parameter sets differ from one another in accordance with the operating parameters to be allocated to a respective local control unit.

The plurality of parameter sets can be stored in each local control unit such as in a first nonvolatile memory. The recognition criterion, and a plurality of values of the recognition criterion, can accordingly be stored in a second nonvolatile memory. The second nonvolatile memory may be implemented jointly with the first nonvolatile memory on a single storage medium by storage or file structures separate from one another, as long as separate addressing of the storage region remains ensured for the first nonvolatile memory and for the second nonvolatile memory.

An electrical quantity, on the values of which the recognition criterion is based, is to be understood as an electrical quantity in the physical sense, i.e., for example, an electrical voltage, an electrical current, an electrical charge, or a capacitance. The at least two values of this variable can be static in the variable in this case, i.e., each individual value of the recognition criterion can be given, for example, by a fixed voltage value or a fixed capacitance value, or can be given by a dynamic variation of the variable between at least two of its values, thus different pulse frequencies of a pulsed voltage signal, which varies at the defined pulse frequency between two fixed voltage values. In this case, the at least two values of the electrical quantity on which the recognition criterion is based are given by the two voltage values, between which the voltage signal can vary at different frequencies, and the respective specific frequency of the variation forms a value of the recognition criterion in each case.

The preparation of the value of the recognition criterion via the electrical quantity that the recognition criterion may be based on a measurable property of the electrical quantity, which can in turn assume at least two different values, so that a value of the recognition criterion can be prepared via the provision of a measurable implementation of the electrical quantity using the corresponding property. This can take place, for example, by the external provision of a voltage signal having corresponding constant voltage with respect to a reference potential, and the voltage value of the voltage signal with respect to the reference potential forms the value of the recognition criterion. In this case, a specific value of the recognition criterion is prepared for a local control unit by the corresponding voltage signal being externally generated and output to the local control unit, so that the local control unit can measure the voltage value as the recognition criterion and can select the allocated parameter set therefrom.

It is also conceivable to define a value of a recognition criterion via a dynamic profile, for example, a curve of capacitance values of a capacitive sensor, and different curve profiles of the capacitance values correspond to different values of the recognition criterion. The curve profiles may correspond here to the profile of base capacitances of the sensors without objects in their vicinity during a movement of a corresponding vehicle door, and the curve profiles for different vehicle doors differ from one another due to the geometric differences of the vehicle doors and their movement ranges. The preparation of a specific value of the recognition criterion can be implemented by opening one of the vehicle doors.

The query of the recognition criterion is to be understood in these terms as a measurement of the corresponding property, in which the values of the recognition criterion are "coded" in the implementation of the electrical quantity, i.e., for example, a voltage or current measurement or the recording of a time curve of capacitance values of a capacitive sensor and a corresponding comparison to profile curves predetermined in this case as values of the recognition criterion. The query can take place for this purpose upon a centrally controlled recognition command and/or after a startup and/or after a buildup of a power supply of the respective local control unit.

The selection of a parameter set in dependence on the value of the recognition criterion that a unique association between the individual values of the recognition criterion stored in each local control unit and one parameter set exists beforehand in each case, so that upon an occurrence of the corresponding value of the recognition criterion, the associated parameter set is selected for the allocation of the operating parameters.

Due to the storage of a plurality, or of all parameter sets coming into consideration in each individual local control unit, of a specific value of a recognition criterion in each individual local control unit and due to the allocation of a specific parameter set on the basis of a recognition criterion to be prepared externally, forming variations of the local control units can be omitted. Via the external preparation of a value of the recognition criterion, a local control unit can be allocated the parameter set corresponding to this value of the recognition criterion upon a query of the recognition criterion.

As an example, in the case that the associated value of the recognition criterion is only prepared for one local control unit, and as a result an externally prepared value of the recognition criterion can only be queried in this local control unit, a message in the form of a signal is produced at the other local control units, such as by a central control unit, which is connected to all local control units, or by the local control unit at which an externally prepared value of the recognition criterion is registered. In this way, the query of the recognition criterion and accordingly the allocation of the operating parameters can be synchronized in the remaining local control units with the already performed allocation by the externally prepared value at said local control unit.

The operating parameters may each allocated to local control units of a door closing system. The door closing system is configured here as an example to close a vehicle door fully automatically in normal operation, and/or to strengthen a closing movement once it is initiated to carry it out completely against a mechanical resistance, which opposes the closing movement by a sealing lip or similar elastic devices for sealing a closed vehicle door against rainwater or the like. As an example, the closing of the door can take place here upon an external command of a user, for example, given via a remote control, by a hand gesture, or also mechanically by a force action on the corresponding vehicle door, or in the context of a standard routine after a triggering event. As an example, a local control unit comprises in each case at least one motor for carrying out the automated closing movement of the door here. In a door closing system, the functions of the individual local control units are often linked to the usage location in the motor vehicle. Moreover, a knowledge of the usage location of a respective local control unit is helpful for an error diagnosis, for example, to be able to recognize the specific vehicle door at which a closing procedure initiated by the door closing system could not be successfully ended, so that the vehicle door still remains partially open. To be able to react to such problems, the internal knowledge of its usage location is a significant advantage for a local control unit. The allocation according to the method of the operating parameters enables the respective local control units to be able to apply correctly all operating parameters such as duration and curve profile of the closing procedure, motor currents to be applied, etc., but also possible error patterns in dependence on the usage location.

In an alternative design of the disclosure, the operating parameters are each allocated to local control units of a pinch protection system. A pinch protection system is to be understood for this purpose as a system in which individual vehicle doors are each equipped with at least one sensor for recognizing an object in the movement region of the vehicle door during a closing movement, and for each vehicle door detected by the pinch protection system, a local control unit is arranged, which is connected to the at least one sensor of the respective vehicle door. Upon recognition of an object, for example, a human body part such as a hand, in the movement region of the vehicle door, the associated local control unit can prevent pinching of the object such as via a corresponding stop signal at a central control unit, for example, by the central control unit controlling a stopping motor for motorized deceleration of the closing movement at the relevant vehicle door.

It has proven to be advantageous if at least two values of the recognition criterion are stored in each of the local control units, which are each based on at least one voltage value. As an example, the first value of the recognition criterion is prepared in a central control unit and output via a first output of the central control unit at a first of the at least two local control units, and the second value of the recognition criterion is prepared in the central control unit and is output via a second output of the central control unit at a second of the at least two local control units.

The first or second value of the recognition criterion is prepared in this case in the central control unit via corresponding properties of a voltage signal, which has at least two different voltage values. Thus, two static or dynamic voltage signals are generated in the central control unit, which differ from one another in at least one measurable property, i.e., in the case of static voltage signals, for example, in the respective voltage value with respect to a reference or ground potential, or in the case of periodically varying voltage signals in a frequency of the periodicity. The output of the first value of the recognition criterion to the first local control unit here that a signal connection for transmitting a voltage signal exists between the first output of the central control unit and the first local control unit, so that the respective property in which the voltage signals, which each correspond to different values of the recognition criterion, can be measured in the first local control unit as an implementation of the query of the recognition criterion.

The first value and the second value of the recognition criterion are expediently each output here by the central control unit via a first or second trigger line from the first or second output to the first or second local control unit, respectively, and to control the door movement, a corresponding control command is transmitted between the central control unit and the first or second local control unit via the first or second trigger line, respectively. As such, the respective value of the recognition criterion is transmitted from the central control unit to the corresponding local control unit via a trigger line, which is used in normal operation of the higher-order control system, i.e., for example, a door closing or pinch protection system, for the purpose of transmitting a control command to control the door movement—i.e., a command to initiate or stop a closing movement of the vehicle door—between the local control unit and the central control unit.

In the case of a pinch protection system, the transmission of a control command to stop the closing movement of the vehicle door from the local control unit to the central control unit takes place after the recognition of an object in the movement region of the vehicle door by the local control unit via the sensor system connected thereto, while in the case of a door closing system, the transmission of a control command for closing to initiate the closing movement from the central control unit to the local control unit takes place when the central control unit is activated accordingly by a user by utilizing a remote control or hand gestures or the like, or a corresponding routine of the central control unit runs.

A constant first voltage value and a constant second voltage value, respectively, are advantageously each used for this purpose as the first value and as the second value of the recognition criterion. This can take place in that the first voltage value is prepared by outputting a corresponding constant voltage at the first output, and the second value is prepared as a ground voltage value corresponding to a ground, by the second output being set to a ground potential. The two voltage values can also both be selected differently with respect to the ground potential, however. For example, the first or the second voltage value can each be prepared via a voltage applied at the first or second output, respectively, by utilizing a first or second voltage divider, and the first or second voltage divider is formed via a first or second resistance in the central control unit and a constant resistance in the respective local control unit.

In a further advantageous design of the disclosure, a voltage signal which changes at a first clock frequency between at least two voltage values is generated in the central control unit, and is output may be at the first output of the central control unit, and the first clock frequency is thus prepared as the first value of the recognition criterion. Furthermore, a voltage signal which changes at a second clock frequency between at least two voltage values is generated in the second control unit, and is output such as at the second output of the central control unit, and the second clock frequency is thus prepared as the second value of the recognition criterion. As an example, in this case the value range of the voltage values for the voltage signal of the first clock frequency and the voltage signal of the second clock frequency are identical.

Thus, the first and the second voltage value are designed, for example, as square wave signals between the same two voltage values, but with different periods, or oscillate as sinusoidal signals in the same voltage interval, but at different oscillation frequencies. An implementation of the recognition criterion via time-variable voltage signals in each case has the advantage that it can be recognized in each individual local control unit without an external recognition command on the basis of the variations whether the voltage signal prepared as the recognition criterion is applied or not. In the case of a locally recognized variation, a query of the recognition criterion can then take place in each case as a measurement of the frequency of the variation, and can be compared to the stored values.

As an example, a supply voltage is output via the first output to the first local control unit in the central control unit at a first point in time, and thus the first point in time is prepared as the first value of the recognition criterion, and a supply voltage is output via the second output to the second local control unit in the central control unit at a second point in time, and thus the second point in time is prepared as the second value of the recognition criterion. In this way, the allocation can be implemented relatively easily, since no additional components are required for this purpose in the local control units or in the central control unit. The point in time of a beginning power supply is used as the recognition criterion, therefore a jump in a voltage signal.

The local control units may be in communication with one another, for example, via a CAN bus or the like, so that a first local control unit, the power supply of which begins first, can transmit a corresponding signal to a second local control unit. Upon the beginning of the power supply at the second local control unit, an item of information of the first local control unit about a completed allocation of its operating parameters is thus additionally present at the CAN bus or the like, on the basis of which the second local control unit in turn recognizes that its power supply could not have begun first. The first local control unit can recognize this accordingly on the basis of the absence of such an item of information by the second local control unit.

Values of the recognition criterion are expediently stored in each of the local control units, which are each given by different tuples formed from a plurality of predetermined voltage values, and a different value of the recognition criterion is respectively prepared for each of the local control units by applying the voltage values corresponding to the tuple at a number of inputs corresponding to the length of the respective tuple. A tuple of the length n over a set $G=\{g_1, \ldots, g_k\}$ is an ordered combination of n objects, and each individual one of the n objects is respectively given by an element $g_j$ of the set G. Elements $g_j$ can repeat in this case.

In the present case, the respective ordered lists of a specific length are formed as individual values of the recognition criterion, the entries of which are each to be selected from the plurality of predetermined voltage values $U_1, U_2, \ldots$. In this way, for example, a plurality of values of the recognition criterion corresponding to the plurality of local control units, i.e., a plurality of such lists of voltage values is generated. For this purpose, the number of the entries at which the corresponding voltage values $U_1$, $U_2$, . . . can be applied at the respective local control unit is to be taken into consideration for the length of the tuple, i.e., the list of voltage values $U_1$, $U_2$, . . . . In this case, each of the local control units is respectively formed in such a way that in consideration of the number of the voltage values to be provided in the higher-order application of the local control units, sufficiently many entries for the application of the voltage values are provided that the number of possible tuples over the voltage values is at least as many as the number of the local control units which are provided in the higher-order application.

For example, in the case in which four local control units are provided in a door closing system, and the two voltage values $U_0$, $U_v$ can be provided, and $U_0$ corresponds to a ground potential and, $U_v$ has the same voltage value as a supplier voltage of the local control units, a total of four values of the recognition criterion can be generated by tuples each having two ordered voltage values: ($U_0$, $U_0$), ($U_0$, $U_v$), ($U_v$, $U_0$), ($U_v$, $U_v$). Thus, for each of the local control units, a corresponding value of the recognition criterion can be prepared via the application of the corresponding voltage values at two inputs, so that a different value is prepared for each of the four local control units.

One advantage of the mentioned design of the disclosure is in this case that the voltage values corresponding to the respective value of the recognition criterion for a local control unit do not have to be provided by a "master", as can be given, for example, in a central control unit of the higher-order application, but rather are implementable independently thereof.

As an example, the voltage values corresponding to the tuple are each provided by a corresponding number of wire connections of a wire harness for each of the local control units, and one wire connection is connected to one input in each case. This may include that the wire harness of the motor vehicle is configured to provide at least two voltage values, and one of the voltage values can correspond to a ground potential. In particular, in this case the specific selection of the combination of voltage values to be applied at a specific local control unit according to its respective value of the recognition criterion can be achieved by the arrangement of jumpers or devices of comparable effect between individual strands of the wire harness.

In one or more embodiments, an arrangement of a number of jumpers in individual line strands of a wire harness of a motor vehicle for outputting a predetermined combination of voltage values at a number of cable ends if the wire harness is supplied with voltage under normal conditions, and also the use of a correspondingly prepared wire harness to output a defined combination of voltage values as a recognition criterion for a local control unit, which is provided to control a door movement in a motor vehicle.

It has furthermore proven to be advantageous if at least two values of the recognition criterion are stored in each of the local control units, which are each given by different sequences of a plurality of base capacitances of capacitive sensors, and the first value of the recognition criterion is prepared in the first local control unit by interconnecting a plurality of capacitive sensors with the first local control unit according to a first sequence, and the second value of the recognition criterion is prepared in the second local control unit by interconnecting a plurality of capacitive sensors with the second local control unit according to a second sequence.

This may include the case that each local control unit m, n, . . . is connected to the same plurality of capacitive sensors, and the capacitive sensors connected to a local control unit m have different base capacitances $C_{m,1}$, $C_{m,2}$, . . . . The interconnection at a local control unit m in this case is such that the base capacitances $C_{m,1}$, $C_{m,2}$, . . . of the capacitive sensors are ordered ascending with respect to the ordered terminals $m_1$, $m_2$, . . . , thus in particular $C_{m,1}<C_{m,2}$ applies, while in contrast at a local control unit n, the interconnection is such that the base capacitances $C_{n,1}$, $C_{n,2}$, . . . are ordered descending with respect to the sequence of the terminals $n_1$, $n_2$, and in particular $C_{n,1}>C_{n,2}$ applies. The values of the recognition criterion to be stored in the local control units are then the ordered sequences of the base capacitances $C_{m,1}<C_{m,2}$, . . . $C_{n,1}>C_{n,2}$, . . . , and the preparation of a value of the recognition criterion then consists of the specific interconnection of the capacitive sensors according to the sequence provided for a present local control unit due to its usage location.

In one or more embodiments, capacitance values of a capacitive sensor of the pinch protection system are stored in the first local control unit and in the second local control unit as values of the recognition criterion, which correspond to a relative movement of a vehicle door of the motor vehicle if it comprises the capacitive sensor, and a vehicle door detected by the pinch protection system is moved by a central control unit, and the capacitance values of the capacitive sensor of the relative vehicle door connected to the respective local control unit are queried as the recognition criterion. As an example, in this case values of a base capacitance without objects in the immediate surroundings of the capacitive sensor are stored.

As an example, for this purpose curves of capacitance values of the respective capacitive sensor can also be stored as values of the recognition criterion, and different curve profiles of the capacitance values correspond to different values of the recognition criterion. The curve profiles may correspond to the profile of the base capacitances of the sensors without objects in their vicinity during a movement of a corresponding vehicle door, and the curve profiles for different vehicle doors differ from one another due to the geometrical differences of the vehicle doors and their movement regions. The preparation of a specific value of the recognition criterion can then be implemented by opening one of the vehicle doors, so that due to the opening of the vehicle door and the movement thus occurring of the capacitive sensor arranged therein, the corresponding curve profile of the capacitance values is generated at the local control unit connected to the capacitive sensor. By simply opening a vehicle door, an allocation of the operating parameters can thus be carried out. As an example, for this purpose a local control unit which is associated with another vehicle door can be signaled by utilizing a recognition command of the central control unit to carry out a query of the recognition criterion, so that an allocation of the operating parameters can also take place in this local control unit due to a non-occurring change of the capacitance values as the recognition criterion.

As an example, a first or second recognition command is output at the first or second local control unit by the central control unit, and the recognition criterion is queried upon the first or second recognition command in the first or second local control unit, respectively. For the case in which a higher-order system for controlling the door movements has such a central control unit, it can be used to synchronize the query of the recognition criterion in the individual local control units. As an example in the case in which an allocation of the operating parameters is to take place at still more local control units, correspondingly more recognition commands are output.

It has furthermore proven to be advantageous if the recognition criterion is queried in each of the local control units in the event of a change of the operating state of the motor vehicle, and/or if an allocation of operating parameters which has taken place once in one of the local control units is maintained for a predetermined number of changes of the operating state of the motor vehicle. A change of an operating state of the motor vehicle is to be understood as a change of the power supply of the motor vehicle by the battery, which can take place, for example, in the event of a restart after prior turning off and locking of the motor vehicle, and also in the case of a complete disconnection of the power supply due to a disconnection of the battery. In this way, on the one hand, a clear routine is defined for the querying of the recognition criterion, on the other hand, in this case a query can take place if a replacement of a local control unit is potentially possible during an inactive operating state.

It is expediently checked in each of the local control units whether in the case of a query of the recognition criterion, a value of the recognition criterion was determined with sufficiently high reliability, and a selection of the parameter set takes place in dependence on the check. A determination of the value with sufficiently high reliability can be defined as a characteristic value for an uncertainty in the query, for example, via an absolute or time-averaged deviation of the respective property of the electrical quantity from the stored values, and the value of the recognition criterion can only be accepted as sufficiently reliably determined if the characteristic value for the uncertainty does not exceed a predetermined limiting value.

As an example, a selection of the parameter set only takes place if the value of the recognition criterion can be determined with sufficiently high reliability, and for the case in which the value of the recognition criterion is not sufficiently reliably determined, a repetition of the query may take place and/or an error signal is transmitted to the other local control units and/or to a central control unit, so that the higher-order system only starts its normal operation when an error-free allocation of the operating parameters can be verified for all local control units.

The second-mentioned object is achieved according to the disclosure by a local control unit for controlling a door movement for a motor vehicle, comprising a first nonvolatile memory for storing a plurality of parameter sets of operating parameters, a second nonvolatile memory for storing a recognition criterion based on at least two values of an electrical quantity, recognition means for querying the recognition criterion, and a processor unit for selecting a parameter set in dependence on the value of the recognition criterion queried by the recognition means.

Recognition means are to be understood in this case in general as any technical means which are configured to query the corresponding value of the recognition criterion in the local control unit. As an example, in this case this can be a measuring device for measuring the relevant electrical quantity, i.e., a voltage, a current, a resistance, or a capacitance. The second nonvolatile memory can also be implemented jointly with the first nonvolatile memory on a single storage medium by storage or file structures separate from one another, as long as separate addressing of the storage region for the first nonvolatile memory and for the second nonvolatile memory remains ensured. As an example, the second nonvolatile memory is configured to store a plurality of values of the recognition criterion.

The advantages specified for the method for allocating operating parameters and for its refinements can be transferred in this case accordingly to the local control unit.

As an example, the local control unit is provided in this case to be incorporated into a system which has multiple equivalent local control units, which are provided together for controlling door movements of different vehicle doors, and each individual vehicle door can be controlled by one or more of the local control units. As an example, this system is designed as a pinch protection system or as a door closing system.

The present disclosure furthermore mentions a pinch protection system for a motor vehicle having a first local control unit and a second local control unit of the above-described type and a central control unit which is configured to carry out the above-described method, and furthermore a door closing system for a motor vehicle having a first local control unit and a second local control unit of the above-described type, and a central control unit which is configured to carry out the above-described method. The advantages specified for the method and its refinements may each be transferred accordingly to the pinch protection system and to the door closing system. A local control unit in the door closing system may include in each case at least one motor for carrying out the automated closing movement of the door. As an example, different vehicle doors can be equipped with various numbers of local control units in the door closing system, to thus be able to better take into consideration different requirements when closing the vehicle doors.

BRIEF DESCRIPTION OF THE DRAWINGS

An exemplary embodiment of the disclosure is explained in greater detail hereinafter on the basis of a drawing. In the schematic figures.

Figure 1:
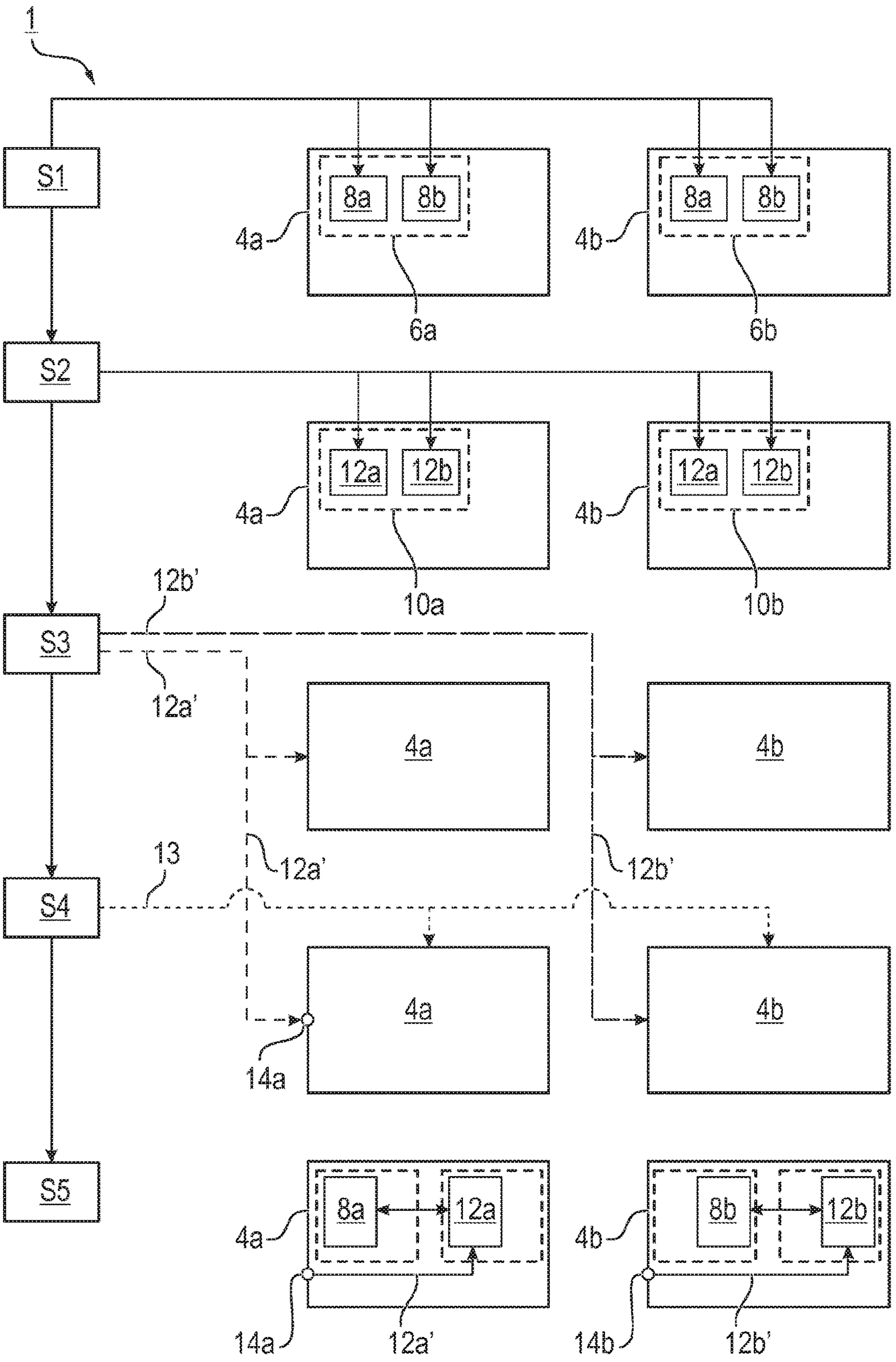
FIG. 1 shows, in a block diagram, a method for allocating operating parameters to a plurality of local control units for controlling door movements for a motor vehicle.

Parts and variables corresponding to one another are each provided with identical reference signs in all figures.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In a pinch protection system, during a closing movement of a vehicle door, an object located in the movement region of the vehicle door, in particular a human body part such as a hand or the like, can be recognized by a sensor device, and the closing movement can be stopped before an injury occurs on said body part due to pinching in the closing vehicle door.

For the control of the door movement, the mentioned systems are usually equipped with local control units, which are in turn frequently connected to a central control unit. In the case of a pinch protection system, the local control units each have the corresponding sensor devices to recognize objects in the movement region of the vehicle door, and the central control unit, if necessary, gives a command to stop a door movement. The process of stopping is then activated via the central control unit. In a door closing system, the local control units can also comprise the motors for carrying out the closing movement, and the central control unit only gives the corresponding command to close a specific vehicle door.

In both cases, individual local control units are to be operated using different operating parameters in dependence on their usage location, for example, with respect to a pattern of sensor values for recognizing objects in a local control unit of a pinch protection system, and the corresponding sensor values of the different vehicle doors are different from one another, or with respect to a movement pattern of a motor during the closing of a vehicle door in case of a door closing system.

The requirement of operating the various local control units using different operating parameters in dependence on the usage location could be fulfilled, on the one hand, by design differences and thus by variants of the local control units. However, this is undesirable due to the additional expenditure thus resulting during the production. On the other hand, the respective usage location and thus the operating parameters to be used could also be selected via a physical plug at the respective local control unit. This can result in errors, however, in particular if the corresponding plug suffers from a loose contact, for example, due to shocks of the motor vehicle. The functionality of the entire system can be endangered in this case by such errors in the association, which can result in an undesired repair process.

A method 1 for allocating operating parameters to a first local control unit 4*a* and a second control unit 4*b* is schematically described in a block diagram in FIG. 1. The first local control unit 4*a* and the second local control unit 4*b* are intended to control door movements in a motor vehicle (not shown in greater detail). In a first step S1, in each case the same parameter sets 8*a*, 8*b* of operating parameters are each stored in a first nonvolatile memory 6*a*, 6*b* of the respective local control unit 4*a*, 4*b*. Each of the two local control units 4*a*, 4*b* is then to be operated using the operating parameters of one of the parameter sets 8*a*, 8*b* in each case in normal operation.

To allocate the corresponding parameter set 8*a*, 8*b* to the respective local control unit 4*a*, 4*b* for this purpose, in a second step S2, the same values 12*a*, 12*b*, which differ from one another, of a recognition criterion are each stored in a second nonvolatile memory 10*a*, 10*b* of the respective local control unit 4*a*, 4*b*. The recognition criterion is based here on at least two values of an electrical quantity, so that the recognition criterion itself is given by a measurable property of the electrical quantity. The values 12*a*, 12*b* can correspondingly be given, for example, by constant voltage values U1, U2 different from one another, or by different frequencies f1, f2 of a voltage signal, which changes periodically between two constant values U1, U2. Other possible designs of the recognition criterion are described in greater detail hereinafter.

In next step S3, a value 12*a*', 12*b*' is prepared for in each case each of the two local control units 4*a*, 4*b*, in that in each case an implementation of the electrical quantity having the property is transmitted to the relevant local control unit 4*a*, 4*b* which corresponds to the value 12*a*, 12*b* of the recognition criterion. Thus, for example, a voltage signal having the constant voltage U1 can be transmitted to the first local control unit 4*a* and a voltage signal having the voltage U2 can be transmitted to the second local control unit 4*b*, or a voltage signal periodically pulsed at the frequency f1 to the first local control unit 4*a* and a voltage signal periodically pulsed at the frequency f2 to the second local control unit 4*b*.

In a step S4, the present value 12*a*', 12*b*' of the recognition criterion is now queried in each of the local control units 4*a*, 4*b*. On the one hand, this can take place upon a corresponding recognition command 13 given centrally to the local control units 4*a*, 4*b*. On the other hand, the local control units 4*a*, 4*b* can also recognize due to the presence of the implementation of the electrical quantity, thus, for example, due to the application of a constant or periodic voltage signal at a corresponding input 14*a*, 14*b*, that a query of the value 12*a*', 12*b*' of the recognition criterion, which was prepared in S3 and is now input at the input 14*a*, 14*b*, is to take place.

In a step S5, the parameter set 8*a* is selected on the basis of the value 12*a*' of the recognition criterion determined in the first local control unit 4*a*, which was input at the input 14*a*, on the basis of a correspondence to the value 12*a* stored in the second nonvolatile memory 10*a*, and the first local control unit 4*a* is operated from then on using the operating parameters of the parameter set 8*a*. The second local control unit 4*b* is operated using the operating parameters of the parameter set 8*b*, in accordance with the value 12*b*', which was input at the input 14*b*, due to the correspondence to the stored value 12*b*.

In addition, to avoid errors, a step not shown in greater detail can take place, in which it is checked in each of the two local control units 4*a*, 4*b* whether upon the query the respective value 12', 12*b*' input via the input 14*a*, 14*b* corresponds with sufficient reliability to one of the values 12*a*, 12*b* respectively stored in the second nonvolatile memory 10*a*, 10*b*, for example, on the basis of limiting values for possible deviations. If the deviations of the queried value 12*a*' from all stored values 12*a*, 12*b* of the recognition criterion exceed a predetermined limiting value, the query can thus be repeated in step S4.

Figure 2:
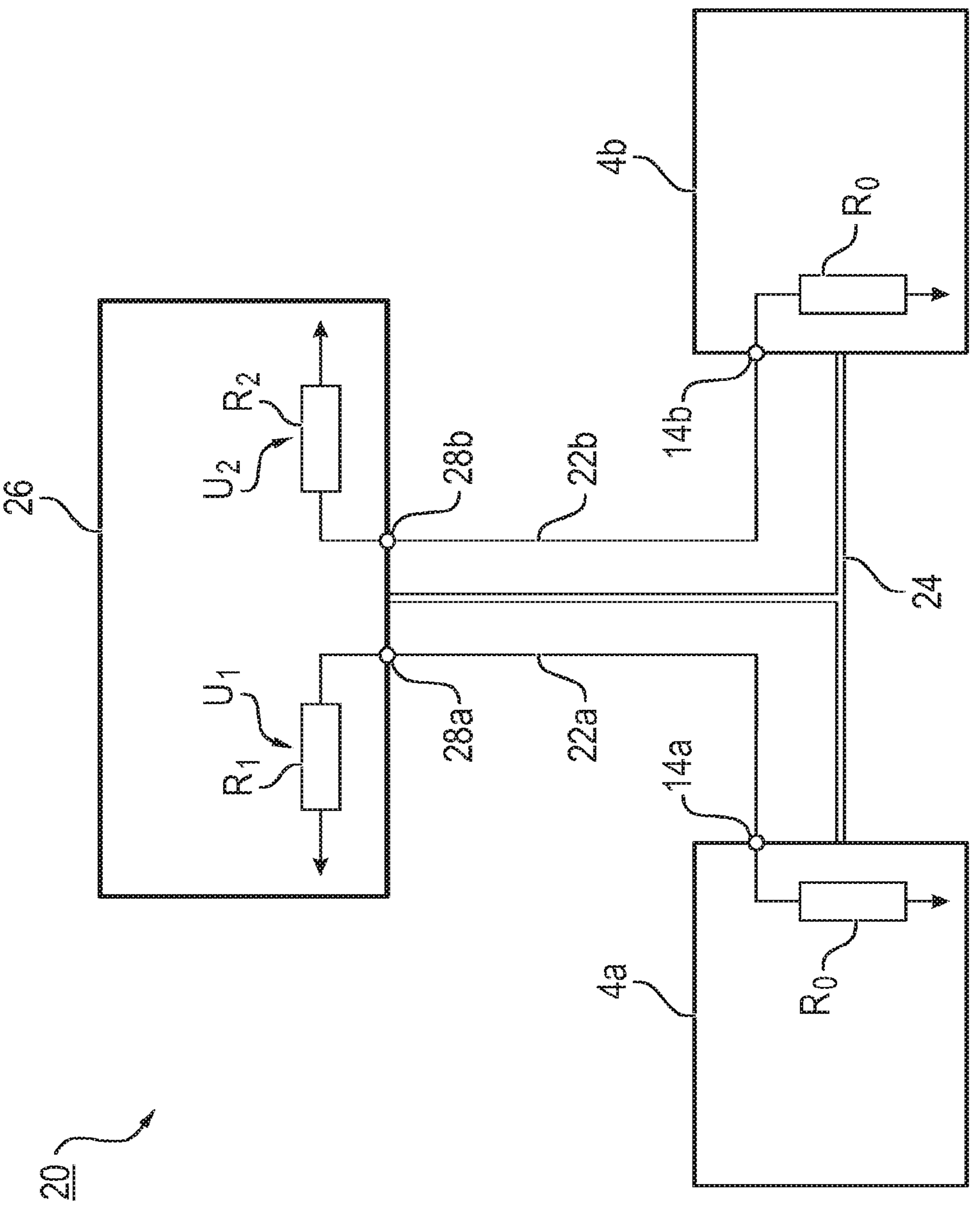
FIG. 2 shows, in a block diagram, a pinch protection system having two local control units, to each of which operating parameters are allocated via constant voltage values.

A pinch protection system 20 having two local control units 4*a*, 4*b* is schematically shown in a block diagram in FIG. 2, which are each connected via a trigger line 22*a*, 22*b* and a CAN bus 24 to a central control unit 26.

In normal operation of the pinch protection system 20, the first local control unit 4*a* gives, via the trigger line 22*a* to the first central control unit 26, a stop command to stop a closing movement of the vehicle door which is associated with the first local control unit 4*a* if a capacitive sensor (not shown in greater detail) on this vehicle door, which is connected to the first local control unit 4*a*, establishes the presence of an object, for example, a human hand in the movement region of the closing movement. The central control unit then controls the automated interruption of the closing movement of this vehicle door, for example, via an activation of corresponding motors.

For an allocation of the operating parameters to the first or second local control unit 4*a*, 4*b*, a constant voltage $U_1$, $U_2$ where $U_1 \neq U_2$ can be output to the first or second local control unit 4*a*, 4*b* by the outputs 28*a*, 28*b* via the trigger lines 22*a*, 22*b*, respectively. The allocation is then carried out on the basis of the respective voltage $U_1$, $U_2$ determined in the relevant local control unit 4*a*, 4*b*.

It is possible in this case that, for example, $U_2=0$ is selected. Since in this case the second local control unit 4*b* does not register any change of the signal in relation to the normal state in an idle mode at the input 14*b*, a recognition command 13 may be given via the CAN bus 24

However, the voltages $U_1$, $U_2$ output via the outputs 28*a*, 28*b* of the central control unit 26 can also both be nonzero. This can be achieved for example in that a voltage divider is formed in each case by utilizing a resistance $R_0$ interconnected in the local control unit 4*a*, 4*b* with the input 14*a*, 14*b*, the value of which is equal for both local control units 4*a*, 4*b*, and a resistance $R_1$, $R_2$ selected correspondingly in the central control unit 26, so that with respect to a reference potential at the inputs 14*a*, 14*b*, different voltages $U_1 \neq U_2$ corresponding to the voltage dividers formed via the different resistances $R_1$, $R_2$ are applied.

Figure 3:
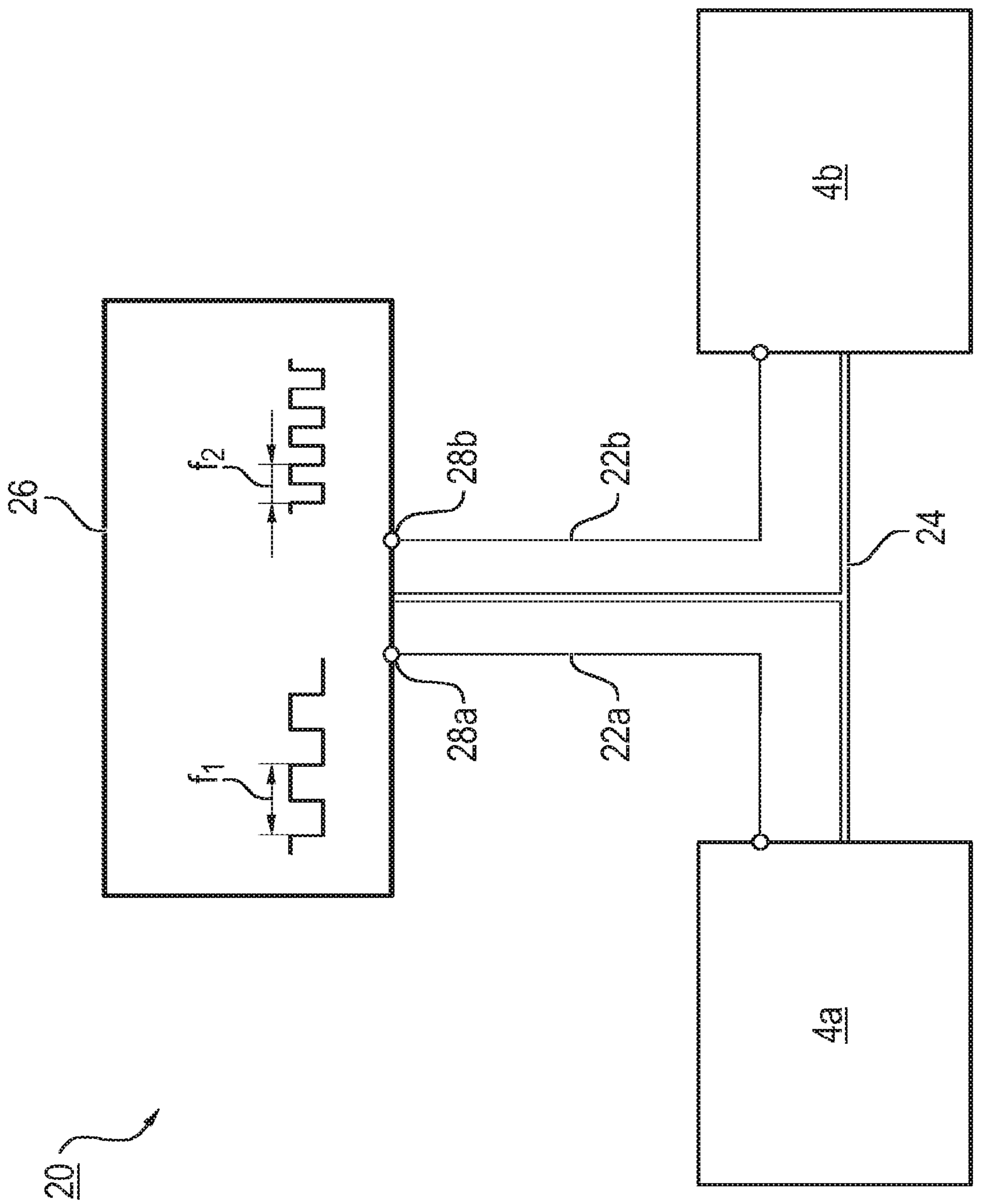
FIG. 3 shows the pinch protection system according to FIG. 2 having an allocation of the operating parameters via AC voltage frequencies.

FIG. 3 schematically shows in a block diagram a variant of the pinch protection system 20 according to FIG. 2, and the voltage signal output at the outputs 28*a*, 28*b* is formed by periodic square wave voltages of different frequencies $f_1$, $f_2$. The allocation of the operating parameters is then carried out on the basis of the frequency $f_1$, $f_2$ respectively determined in the local control unit 4*a*, 4*b*.

Figure 4:
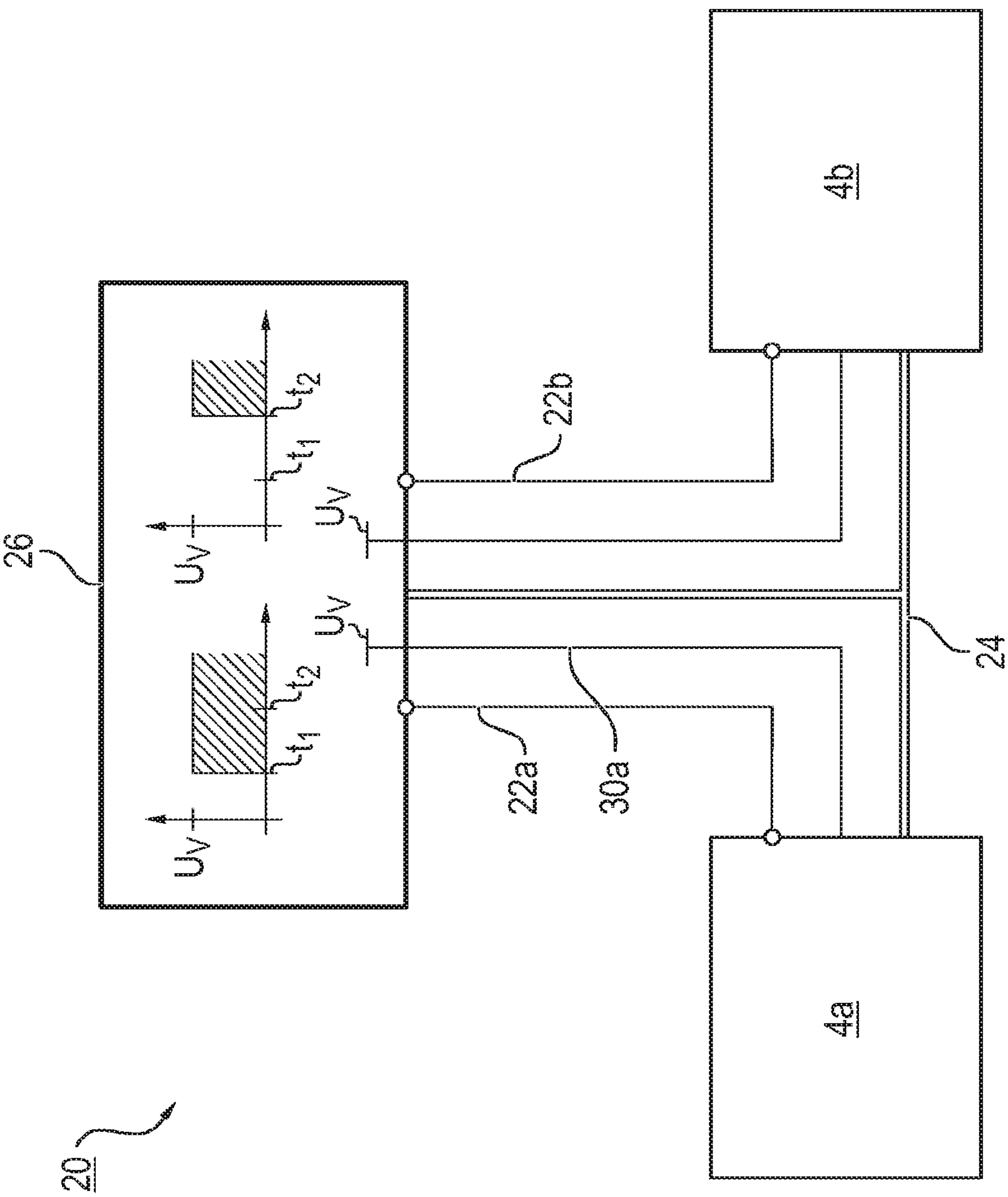
FIG. 4 shows the pinch protection system according to FIG. 2 having an allocation of the operating parameters via the supply voltage.

A variant of the pinch protection system 20 according to FIG. 2 is schematically shown in a block diagram in FIG. 4, and an allocation of the operating parameters takes place via an output of a supply voltage $U_v$ at different points in time $t_1$, $t_2$. The local control units 4*a*, 4*b* are connected to the central control unit 26 via supply lines 30*a*, 30*b*, via which they each acquire a supply voltage $U_v$ for the power supply for the operation. This supply voltage $U_v$ can now be output at the first local control unit 4*a* at a first point in time $t_1$, so that the first local control unit 4*a* begins the operation before the second local control unit 4*b*, which only receives the supply voltage $U_v$ at a second point in time $t_2>t_1$.

On the basis of a simple communication protocol between the first and the second local control unit 4*a* or 4*b*, which can take place, for example, via the CAN bus 24, the respective local control unit 4*a*, 4*b* can recognize upon the operation start due to the beginning supply voltage $U_v$ whether the respective other local control unit 4*a*, 4*b* is already in operation, and can therefrom recognize the point in time $t_1$ or $t_2$ when the supply voltage $U_v$ has begun. This point in time $t_1$, $t_2$ can now be used as a recognition criterion for an allocation of the operating parameters.

Figure 5:
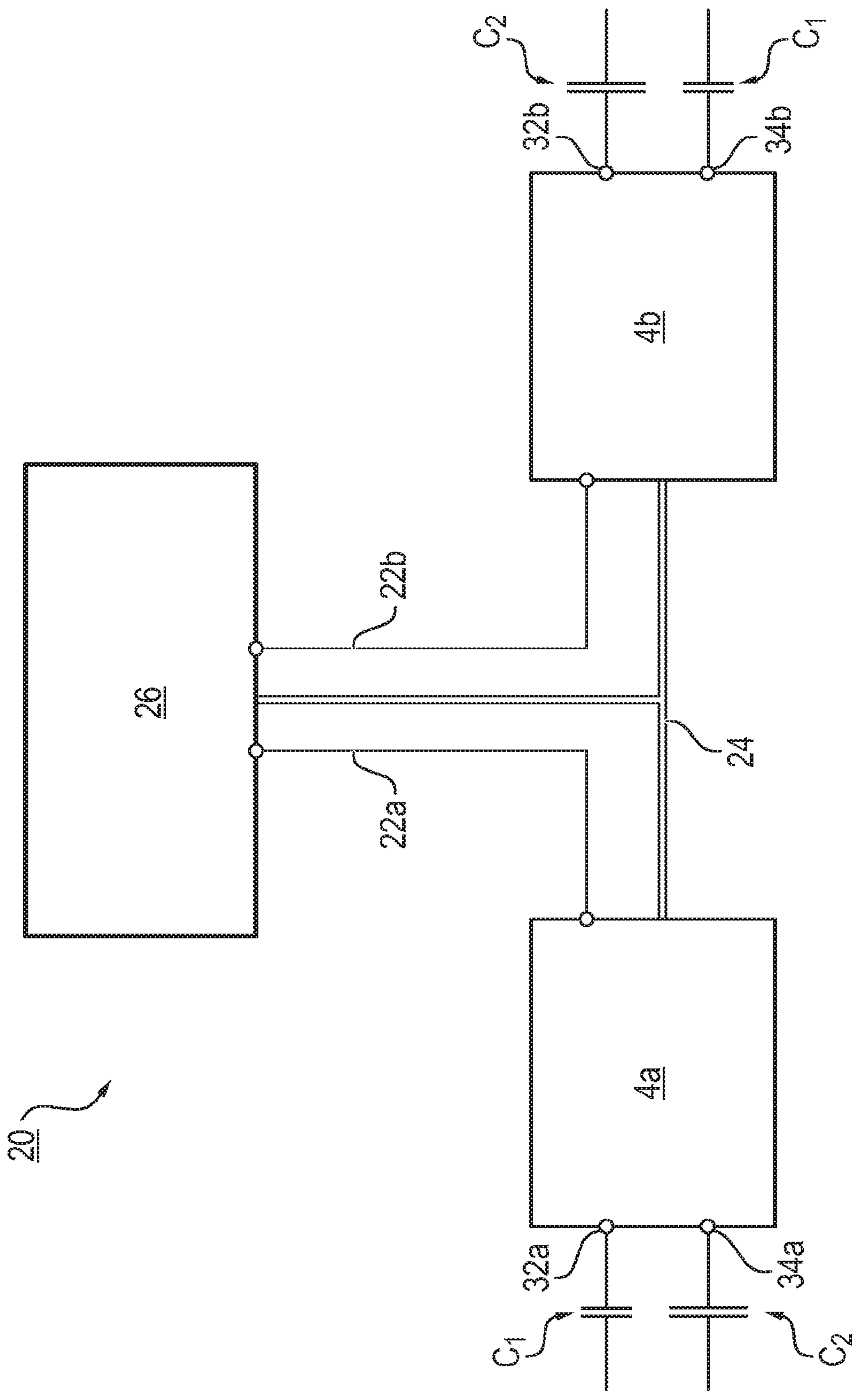
FIG. 5 shows the pinch protection system according to FIG. 2 having an allocation of the operating parameters via a different interconnection of capacitive sensors.

A variant of the pinch protection system 20 according to FIG. 2 is schematically shown in a block diagram in FIG. 5, and an allocation of the operating parameters is carried out via a different interconnection of capacitive sensors $C_1$, $C_2$. The two local control units 4*a*, 4*b* are each interconnected here with two capacitive sensors $C_1$, $C_2$ of different base capacitance, and the capacitive sensor $C_1$ having lower base capacitance is applied in the first local control unit 4*a* at a first sensor input 32*a* and the capacitive sensor $C_2$ having higher base capacitance is applied at a second sensor input 34*a*, while in the second local control unit 4*b*, the capacitive sensor $C_1$ having the lower base capacitance is applied at the second sensor input 34*b* and the capacitive sensor $C_2$ having the higher base capacitance is applied at the first sensor input 32*b*. These different sequences of the base capacitances in the interconnection of the capacitive sensors $C_1$, $C_2$ can now be used as a recognition criterion, and in each case the specific value of the recognition criterion is formed by the sequence of the interconnection provided in each case at the individual local control unit 4*a*, 4*b*.

Figure 6:
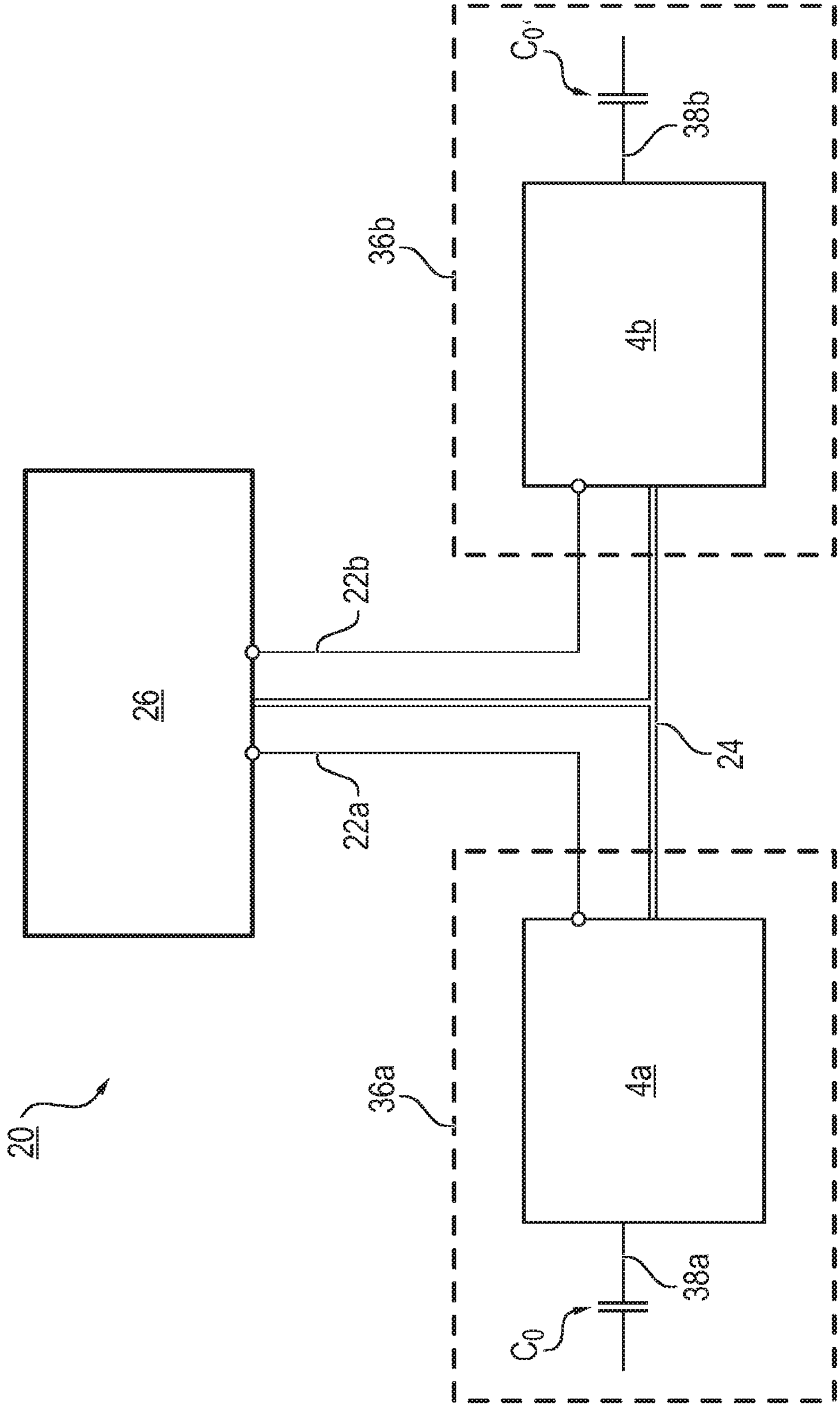
FIG. 6 shows the pinch protection system according to FIG. 2 having an allocation of the operating parameters via the sensor values of capacitive sensors upon opening only one vehicle door.

A variant of the pinch protection system 20 according to FIG. 2 is schematically shown in a block diagram in FIG. 6, and the allocation of the operating parameters is carried out via the sensor values of capacitive sensors $C_0$, $C_{0'}$ upon opening of only one vehicle door. The first local control unit 4*a* is connected to a capacitive sensor $C_0$, the second local control unit to a structurally identical capacitive sensor $C_{1'}$. If the vehicle door 36*a* is set into motion by the central control unit 26, in which the capacitive sensor $C_0$ is arranged, as a result of the movement, it thus outputs a signal 38*a* corresponding to the movement at the first local control unit 4*a*. The other vehicle door 36*b* remains closed in this case, so that the signal 38*b* which is output by the capacitive sensor $C_{0'}$ at the second local control unit 4*b* remains unchanged. This can be used for the allocation of the operating parameters, in that, on the one hand, the curve profile of the capacitance values in the signal 38*a* and, on the other hand, the constant value of the signal 38*b* are stored as values of the recognition criterion.

Figure 7:
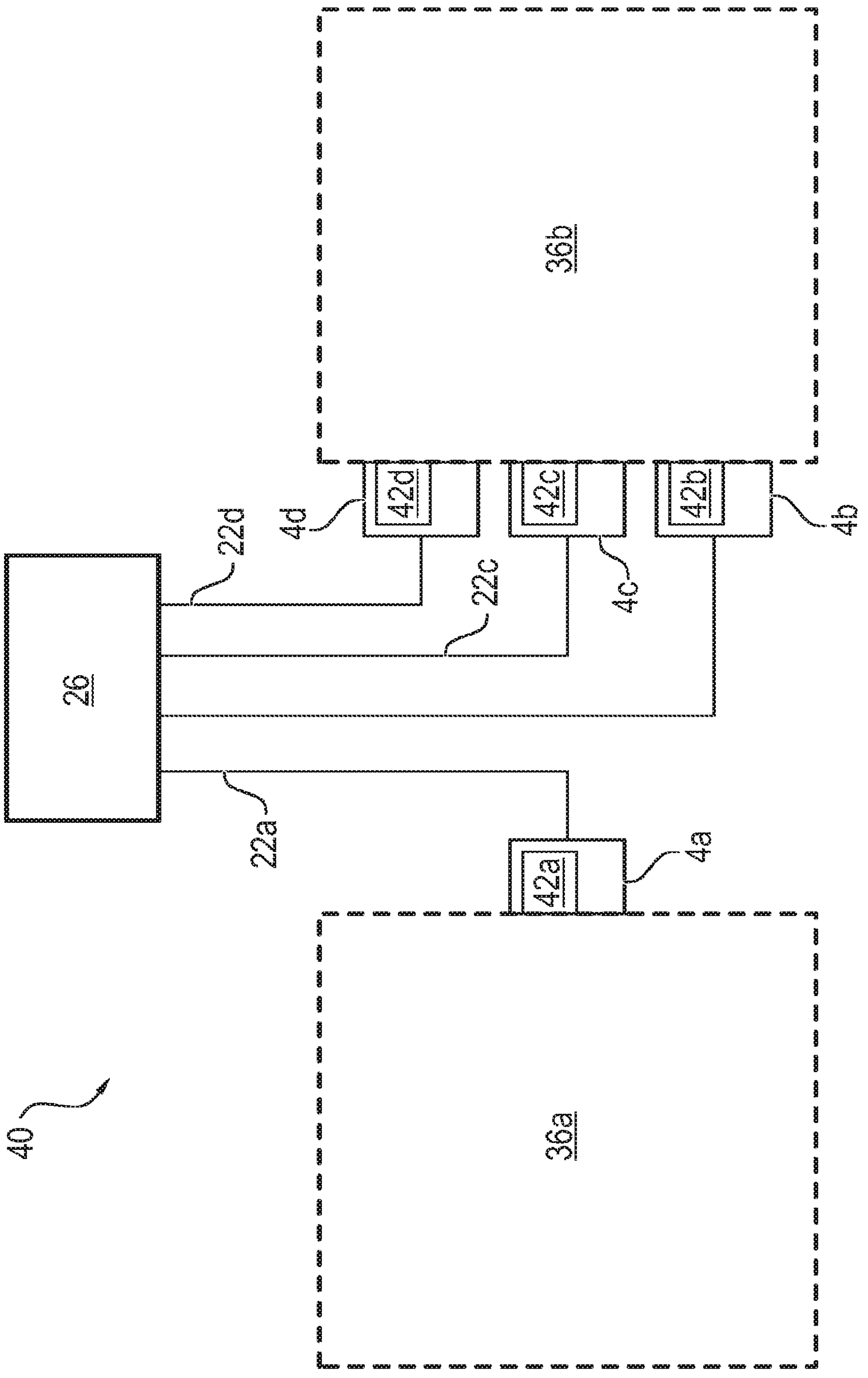
FIG. 7 shows, in a block diagram, a door closing system for two vehicle doors having four local control units, to each of which operating parameters are allocated by the central control unit.

A door closing system 40 for two vehicle doors 36*a*, 36*b* is schematically shown in a block diagram in FIG. 7. In this case, a first local control unit 4*a* for controlling a closing movement of the vehicle door 36*a* by utilizing a motor 42*a* arranged in the first local control unit is arranged on the vehicle door 36*a*, a second local control unit 4*b* and two further local control units 4*c*, 4*d* for controlling a closing movement of the vehicle door 36*b* by utilizing motors 42*b*, 42*c*, 42*d* arranged in the respective local control unit are arranged on the vehicle door 36*b*. The local control units 4*a* to 4*d* are connected to a central control unit 26 via trigger lines 22*a* to 22*d*, via each of which a command to close the relevant vehicle door 36*a*, 36*b* goes from the central control unit 26 to the local control units 4*a* to 4*d*.

During an identification process, different voltage signals in voltage amount and/or AC voltage frequency can be output at the local control units 4*a* to 4*d* via the trigger lines 22*a* to 22*d* by the central control unit 26 in the above-described manner, which can be used in each of the local control units 4*a* to 4*d* as a local value of the recognition criterion for allocating the operating parameters.

Figure 8:
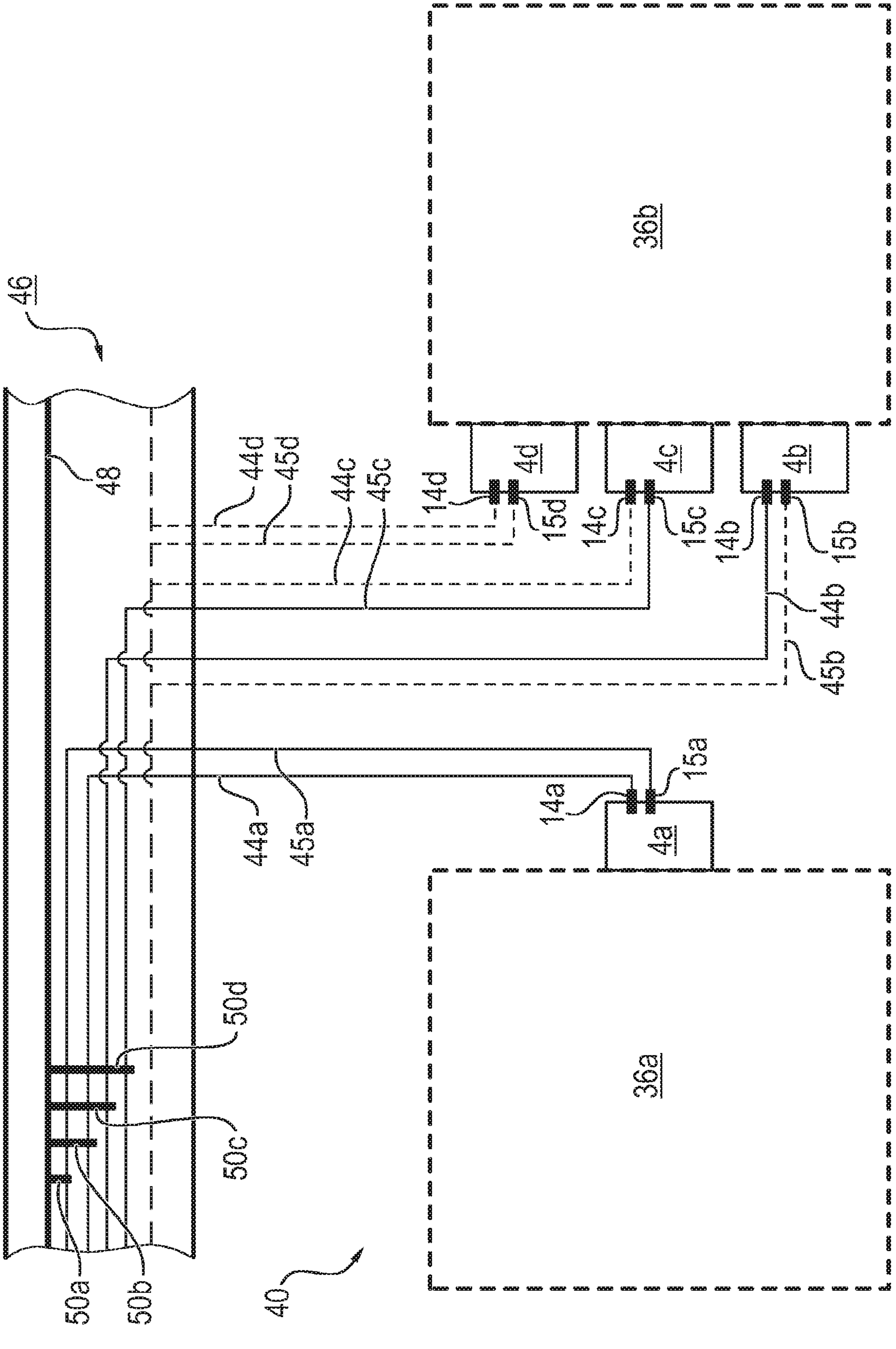
FIG. 8 shows, in a block diagram, the door closing system according to FIG. 7, and the allocation of the operating parameters takes place via signal connections to the wire harness.

An alternative design of the door closing system 40 according to FIG. 7 is shown in a block diagram in FIG. 8. The first local control unit 4*a* has two inputs 14*a*, 15*a*, the second local control unit 4*b* has two inputs 14*b*, 15*b*, the third local control unit 4*c* has two inputs 14*c*, 15*c*, and the fourth local control unit 4*d* has two inputs 14*d*, 15*d*.

One of the lines 44*a-d* or 45*a-d* is connected to each of the mentioned inputs 14*a-d*, 15*a-d*, which are each given by wire connections of a wire harness 46. Furthermore, a ground strand 48 is arranged in the wire harness 46, which is at a ground potential $U_0$. The lines 44*a*, 45*a*, 44*b*, and 45*c* are connected by jumpers 50*a-d* to the ground strand in such a way that the voltage value $U_0$ is applied at the corresponding inputs 14*a*, 15*a*, 14*b*, and 15*c*. The same voltage value $U_v$, which is different from $U_0$, is applied at each of the remaining inputs 15*b*, 14*c*, 14*d* and 15*d* via the lines 45*b*, 44*c*, 44*d*, 45*d*, which are shown by dashed lines in the drawing. In this case, $U_v$ can be branched off from a supplier voltage provided, for example, for the voltage supply of the local control units 4*a-d*.

Due to the mentioned measures, a different combination of the two voltage values $U_0$, $U_v$ is now applied at each of the local control units 4*a-d*: at the inputs 14*a*, 15*a* of the first local control unit 4*a*, ($U_0$, $U_0$) is applied, at the (ordered) inputs 14*b*, 15*b* of the second local control unit 4*b*, ($U_0$, $U_v$) is applied (in sequence of the inputs), at the inputs 14*c*, 15*c* of the third local control unit 4*c*, ($U_v$, $U_0$) is applied, and at the inputs 14*d*, 15*d* of the fourth local control unit 4*d*, ($U_v$, $U_v$) is applied. These voltage combinations are simultaneously stored as values of the recognition criterion in the local control units 4*a-d* so that upon a query of the combination of voltage values applied at the respective two inputs 14*a-d*, 15*a-d*, each local control unit 4*a-d* recognizes at which location it is used and can accordingly allocate the parameter set of operating parameters provided for the operation there for the application.

Although the disclosure was illustrated in greater detail and described by the preferred exemplary embodiment, the disclosure is not restricted by this exemplary embodiment. Other variations can be derived therefrom by a person skilled in the art without leaving the scope of protection of the disclosure.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE SIGNS

1 method
4*a-d* first to fourth local control unit
6*a, b* first nonvolatile memory
8*a, b* parameter set of operating parameters
10*a, b* second nonvolatile memory
12*a, b* stored value of the recognition criterion
12*a', b'* prepared value of the recognition criterion
13 recognition command
14*a-d* input
15*a-d* input
20 pinch protection system
22*a-d* trigger line
24 CAN bus
26 central control unit
28*a, b* output
30*a, b* supply line
32*a, b* first sensor input
34*a, b* second sensor input
36*a, b* vehicle door
38*a, b* signal
40 door closing system
42*a-d* motor
44*a-d* lines
45*a-d* lines
46 wire harness
48 ground strand
50*a-d* jumpers
$C_{1,2}$ first/second capacitive sensor
$C_{0,0'}$ capacitive sensor
$f_{1,\ 2}$ frequency
$R_{0,\ 1,\ 2}$ resistance
S1-S5 method steps
$t_{1,\ 2}$ first/second point in time
$U_{1,\ 2}$ constant voltage
$U_v$ supply voltage While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A method of allocating operating parameters to at least two local control units of a motor vehicle each configured to control door movement, the method comprising:
storing a plurality of parameter sets of operating parameters in each of the local control units;
storing recognition criterion based on at least two values of an electrical quantity in each of the local control units;
preparing a value of the recognition criterion for at least one of the local control units, via the electrical quantity;
querying the recognition criterion in each of the local control units;
selecting a parameter set of the plurality of parameter sets based on the value of the recognition criterion determined in response to the querying step;
allocating the operating parameters to the each of the local control units; and
controlling, via the local control units, the door movement by activating at lea st one door motor of the motor vehicle.

2. The method of claim 1, wherein the operating parameters are each allocated to the local control units of a door closing system.

3. The method of claim 1, wherein the operating parameters are each allocated to local control units of a pinch protection system.

4. The method of claim 3, further comprising:
storing, in each of the local control units, at least two values of the recognition criterion, which are each given by different sequences of a plurality of base capacitances of capacitive sensors,
wherein in a first local control unit, the first value of the recognition criterion is arranged in that a plurality of capacitive sensors are interconnected according to a first sequence with the first local control unit, and
wherein in a second local control unit, the second value of the recognition criterion is arranged in that a plurality of capacitive sensors are interconnected according to a second sequence with the second local control unit.

5. The method of claim 3,
wherein the method further includes storing capacitance values of a capacitive sensor of the pinch protection system in the first local control unit and in the second local control unit as values of the recognition criterion, which correspond to a relative movement of a vehicle door of the motor vehicle, if it includes the capacitive sensor, detecting a vehicle door, utilizing the pinch protection system, is moved by a central control unit, and querying the capacitance values of the capacitive sensor of the relevant vehicle door connected to the respective local control unit.

6. The method of claim 1, wherein the storing recognition criterion step includes storing recognition criterion based on at least two values of the recognition criterion, which are each based on at least one voltage value, are stored in each of the local control units.

7. The method of claim 6, wherein a first value of the recognition criterion is prepared in a central control unit and is output via a first output of the central control unit at a first of the at least two local control units, and wherein a second value of the recognition criterion is prepared in the central control unit and is output via a second output of the central control unit at a second of the at least two local control units.

8. The method of claim 7, wherein the first value and the second value of the recognition criterion are each output by the central control unit via a first or second trigger line from the first or second output to the first or second local control unit, and wherein to control the door movement, a corresponding control command is transmitted between the central control unit and the first or second local control unit via the first or second trigger line.

9. The method of claim 7, wherein in each case a constant first voltage value or a constant second voltage value is utilized as the first value and as the second value (of the recognition criterion.

10. The method of claim 7, wherein a voltage signal changing between at least two voltage values at a first clock frequency is generated in the central control unit, wherein the first clock frequency is prepared as the first value of the recognition criterion, and wherein a voltage signal changing between at least two voltage values at a second clock frequency is generated in the central control unit, and wherein the second clock frequency is prepared as the second value of the recognition criterion.

11. The method of claim 7, wherein a supply voltage is output at a first point in time at the first control unit in the central control unit, wherein the first point in time is prepared as the first value of the recognition criterion, and wherein a supply voltage is output at a second point in time at the second local control unit in the central control unit, wherein the second point in time is prepared as the second value of the recognition criterion.

12. The method of claim 7, wherein the method further includes outputting a first or second recognition command at the first or second local control unit, by the central control unit, and querying the recognition criterion upon the first or second recognition command in the first or second local control unit.

13. The method of claim 6, wherein values of the recognition criterion are stored in each of the local control units, which are each given by different tuples formed from a plurality of predetermined voltage values, wherein a different value of the recognition criterion is prepared in each case for each of the local control units, in that the voltage values corresponding to the tuple are applied at a number of inputs corresponding to the length of the respective tuple.

14. The method of claim 13, wherein for each of the local control units, the voltage values corresponding to the tuple are each provided by a corresponding number of wire connections of a wire harness, and wherein in each case one wire connection is connected to one input.

15. The method of claim 1, wherein the method further includes querying, in each of the local control units, the recognition criterion in response to a change of the operating state of the motor vehicle, or wherein an allocation of operating parameters which has been carried out once in one of the local control units is maintained for a predetermined number of changes of the operating state of the motor vehicle.

16. The method of claim 1, wherein the method further includes the step of checking in each of the local control units whether upon a query of the recognition criterion a value of the recognition criterion was determined with sufficiently high reliability, and wherein a selection of the parameter set takes place in dependence on the checking step.

17. A system configured to control a door movement for a motor vehicle, comprising a first memory configured to store a plurality of parameter sets of operating parameters;

a second memory configured to store a recognition criterion based on at least two values of an electrical quantity;

a sensor configured to query the recognition criterion indicating a measurable property of the electrical quantity;

a processor configured to select a parameter set in dependence on a value of the recognition criterion queried by the sensor; and one or more control units each configured to control the door movement based on the recognition criteria.

18. The system of claim 17, wherein the one or more control units includes a first local control unit and a second local control unit, wherein the first local control unit and second local control unit each include operating parameters of a pinch protection system.

19. The system of claim 17, wherein the one or more control units includes a first local control unit and a second local control unit each including operating parameters of a door closing system.

20. A door closing system of a motor vehicle, comprising:

one or more memory units configured to store a plurality of parameter sets of operating parameters and to store a measurement in response to at least two values of an electrical quantity;

a sensor configured to determine the measurement;

a processor configured to select a parameter set in dependence on a value of the measurement; and one or more control units each configured to control the door movement based on the parameter set.

* * * * *